United States Patent [19]

Guichard et al.

[11] Patent Number: 4,584,604

[45] Date of Patent: Apr. 22, 1986

[54] PROCESS AND APPARATUS FOR THE DISPLAY OF RELIEF MOVING PICTURES

[76] Inventors: Jacques Guichard, 8, rue des Morillons, 75015 Paris; Alain Poirier, 82 rue de la République, 92190 Meudon, both of France

[21] Appl. No.: 517,361

[22] Filed: Jul. 26, 1983

[30] Foreign Application Priority Data

Jul. 29, 1982 [FR] France ................ 82 13242

[51] Int. Cl.⁴ .................................. H04N 13/00
[52] U.S. Cl. ........................... 358/92; 358/88
[58] Field of Search .................... 358/88, 91, 92

[56] References Cited

U.S. PATENT DOCUMENTS

| | | | |
|---|---|---|---|
| 3,293,358 | 12/1966 | Ratliff | 358/88 |
| 3,525,807 | 8/1970 | Herriott | 358/88 |
| 3,529,082 | 9/1970 | Hoesli | 358/92 |
| 4,214,257 | 7/1980 | Yamauchi | 358/92 |
| 4,305,095 | 12/1981 | Dallas | 358/88 |

FOREIGN PATENT DOCUMENTS 2058160 5/1971 France .
2400812 3/1979 France .

OTHER PUBLICATIONS

*Rundfunktechnische Mitteilungungen,* vol. 13, No. 3, Mayer et al., "Stereospopisches Fernschen", pp. 123–134.

*Primary Examiner*—James J. Groody
*Assistant Examiner*—Victor R. Kostak
*Attorney, Agent, or Firm*—Michael N. Meller

[57] ABSTRACT

Process and apparatus for the display of relief moving pictures. The displayed image is formed behind a lenticular frame having vertical cylindrical lenses and its spacing exceeds that of the frame. The picture is obtained either by a screen attached to the frame, or by projecting the picture from a separate screen. The apparatus has useful application in visiophony, television, simulation, etc.

24 Claims, 7 Drawing Figures

PROCESS AND APPARATUS FOR THE DISPLAY OF RELIEF MOVING PICTURES

BACKGROUND OF THE INVENTION

The present invention relates to a process and to an apparatus for the display of relief moving pictures. It is used more particularly in the transmission of moving pictures on a network (switched, broadcasting, broadband, etc) and in particular in visiophony, i.e. in telephony accompanied by the bilateral transmission of pictures. The invention is also used in the formation of relief moving pictures in simulation systems, video games, etc, in which the pictures are produced from informatics means.

A considerable amount of research has already been carried out on the formation of relief moving pictures, particularly television pictures. However, the hitherto conceived solutions have not given rise to satisfactory realizations, because they all suffer from serious disadvantages. The best known of these, which is similar to a solution envisaged for cinematography, consists of providing the televiewer with special spectacles, whereof the two different lenses make it possible to see on the receiver screen two different pictures representing the images which are respectively perceived by the right eye and the left eye of the observer. This need for the viewer to wear spectacles is naturally a serious handicap, which has hampered the development of this method.

Another solution is described in FR-A No. 1,543,994, granted on Sept. 23, 1968, for "An integral relief, colour television process and apparatus". Use is made therein of two orthogonal frames, both when shooting and when reconstructing the picture. On shooting, the first frame is a lenticular relief analyzing frame and comprises juxtaposed vertical cylinder lenses with a concave diopter. These lenses produce a plurality of images in their focal plane. The second frame is a lined color selection frame, which is placed in the focal plane of the lenticular system. The shooting camera consequently analyzes a doubly framed image. On reception, a first horizontal frame is constituted by phosphor lines with alternating colors, these lines making it possible to reconstruct a picture in color. A second frame formed by juxtaposed vertical cylindrical lenses with a convex diopter is placed in front of the first. The viewer then sees the picture in color through the lenticular frame, which restores the relief.

Such a system suffers from the disadvantage of using a cathode ray tube, whose scanning is not sufficiently stable for the picture elements formed on the tube screen to be correctly aligned and permanently behind the optical separator. Thus, there is a sufficiently serious relief loss to dissipate any interest in the system.

Another solution is described in French Patent Application FR-A No. 2,400,812 entitled "Three-dimensional television picture reproduction apparatus". Once again, it involves the use of a lenticular frame, but the latter is attached to a matrix-type, flat-faced screen forming two overlapping pictures, one being seen by the right eye and the other by the left eye. Although this apparatus is satisfactory in certain respects, the observation conditions for the thus formed pictures are not completely satisfactory.

The research carried out by the present inventors on this subject has provided a better understanding of the origin of these difficulties. It has been found that the observing comfort could be considerably improved by breaking with certain prejudices of the prior art, the first of them consisting of transferring the structure of the screen onto that of the lenticular frame on which it rests. In particular, in the last-mentioned specification, the spacing of the screen is always equal to that of the lenticular frame. However, surprisingly, the present inventors have found that this was one of the causes of the poor results obtained and that the pictures observed had a better quality if the spacing of the image formed behind the lenticular frame was larger than that of the frame.

BRIEF SUMMARY OF THE INVENTION

Thus, the present invention relates to a process for the display of relief moving pictures, in which an image is formed behind a lenticular frame formed by vertical cylindrical lenses with a front convex diopter, these lenses being regularly juxtaposed with a given spacing. The frame has a focal plane in which is formed the image, the latter being formed by overlapping images and being constituted by horizontal lines of display elements. The display elements corresponding to the different overlapping images are juxtaposed in a given identical and repeating order, the display elements belonging to different lines and corresponding to the same overlapping image being vertically aligned, the distance separating the two consecutive display elements of the same line belonging to the same overlapping image constituting the spacing thereof, wherein a picture is formed having a larger spacing than that of the lenticular frame.

In order to obtain this result, it is naturally possible to add a matrix screen having an appropriate spacing from the lenticular frame. However, the invention provides more advantageous means consisting of separating the screen from the frame and forming on the screen, by appropriate optical means, an image at the back of the lenticular frame. It is then easy to regulate the spacing of the image to its optimum value for obtaining the best result, bearing in mind the observation conditions. Thus, the invention provides a greater flexibility to the display means.

A second prejudice of the prior art involved the belief that the right- and left-hand images had to be constituted by either black or white display elements. However, the inventors have shown that the formation of images in halftones made it possible to surprisingly improve the quality of the pictures observed and that this arrangement was indispensable for natural pictures.

A third prejudice of the prior art involved a belief in the fact that the number of display elements associated with each lens had to be even (e.g. 2 or 4), which resulted from the symmetry imposed by the identity of the spacings of the lenticular frame and the image. According to the invention, a random number of display elements can be used and in particular an uneven number.

The invention also provides certain advantageous arrangements with respect to the formation of the different signals necessary for controlling the matrix screen. None of these arrangements was provided in the aforementioned prior art.

According to a first variant, multiple shooting takes place under several different angles. The signals resulting therefrom are transmitted (either separately, or by multiplexing, or by coding) to a receiver. When the signals are transmitted by coding, one of them can be transmitted completely and the others by the variation thereof with respect to the complete signal, so as to reduce the transmitted information quantity.

Multiple shooting can be obtained either by several cameras (e.g. two or more), or by a single camera, provided that it is equipped with optical means (mirrors, semitransparent plate, optical separator, etc) making it possible to really define different shooting angles.

According to a second variant, the control signals are produced by informatics means able to calculate successive image groups (right and left images), which are stored in an image store and are then read during the display. These means can consist of a microprocessor and a computer.

The invention also relates to an apparatus for performing the process described hereinbefore. This apparatus is characterized by the existence of a picture formed in the focal plane of the lenticular frame, this picture having a spacing greater than that of the frame.

According to a first variant, the display screen making it possible to obtain this picture is in the focal plane of the lenticular frame.

According to a second variant, the screen is separated from the frame and optical means project the picture from the screen onto a focal plane of the frame.

According to a first embodiment, means are provided for carrying out multiple shooting under different angles, which can be obtained by using two cameras. The screen then has two groups of display elements. However, it is also possible to use a number of display elements exceeding the number of cameras. In this case, it is necessary to reconstitute intermediate images from the signal supplied by the cameras.

According to a second embodiment, there are no shooting cameras and instead there are informatics means able to calculate the images, store them and then read them.

No matter what the control signal formation mode, the display screen can be of a liquid crystal type, because this type of screen is well adapted to the realization of a matrix structure and it also makes it possible to obtain halftones.

The matrix aspect of the display screen can also be advantageously combined with the matrix character of certain photosensitive means used in shooting in the variant making use thereof. Thus, it is known that cameras exist which use solid state retinas formed by a mosaic of photosensitive elements. Such cameras are well suited to the performance of the invention.

BRIEF DESCRIPTION OF THE DRAWINGS

The invention is described in greater detail hereinafter relative to non-limitative embodiments of the invention and with reference to the attached drawings, wherein.

DETAILED DESCRIPTION OF THE INVENTION

The following description relates to the case where the shooting means comprise two cameras and where the image formed has two display elements. However, as has been stated hereinbefore, it is also possible to use an image or picture having a larger number of display elements associated with each lens (e.g. about 10), as well as a shooting means having more than two cameras, so that the case described is only an exemplified embodiment.

Figure 1:
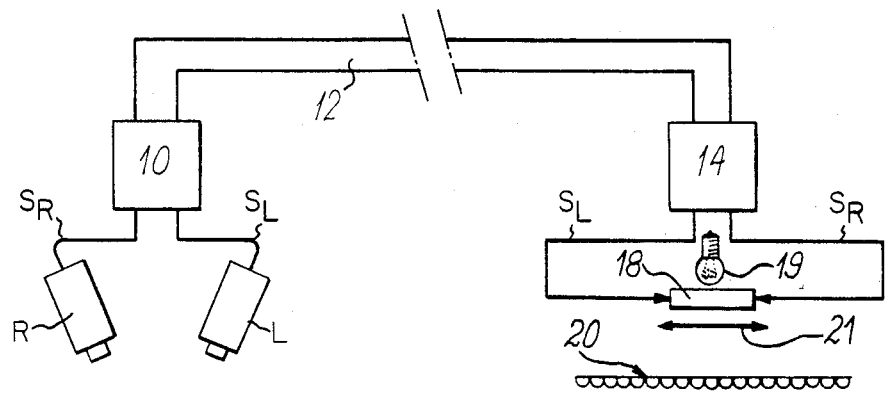
FIG. 1 shows the general diagram of an apparatus according to the invention for multiple shooting.

The apparatus shown in FIG. 1 comprises two shooting cameras, namely the right-hand camera RC and the left-hand camera LC, which supply two video frequency signals $S_R$ and $S_L$, a transmission signal processing circuit 10, a transmission line 12, a reception signal processing circuit 14, a matrix screen 18 controlled by two connections respectively carrying signals SD and SG and a lenticular frame 20 formed by a juxtaposed vertical cylindrical lenses with a front convex diopter. Between screen 18 and frame 20 is provided an optical system 21 for forming the image of the screen on the focal plane of the frame. This image is projected by means of a lamp 19 behind the screen.

According to the essential feature of the invention, the spacing of the thus-formed image exceeds the spacing of the frame. In practice, the variation $\Delta P$ between these spacings, relative to the mean value P thereof, is approximately $10^{-2}$ or $10^{-3}$.

The apparatus functions in the following way. The scene to be transmitted is shot by the two cameras RC, LC under two different angles. In conventional manner, the two video frequency signals are formed by a sequence of line signals representing the light intensity variation along an image line projected onto the photosensitive part of the shooting apparatus, these signals being tuned with respect to sync pulses. If the two signals supplied by the cameras are transmitted independently of one another (e.g. on two independent lines), circuit 10 serves no useful purpose. However, these signals can be transmitted by multiplexing, in which case circuit 10 is a multiplexer, as will be described hereinafter relative to FIG. 5. Circuit 14 serves to restore signals $S_R$, $S_L$ for the control of display screen 18 and carry out interpolations, if necessary.

Figure 2:
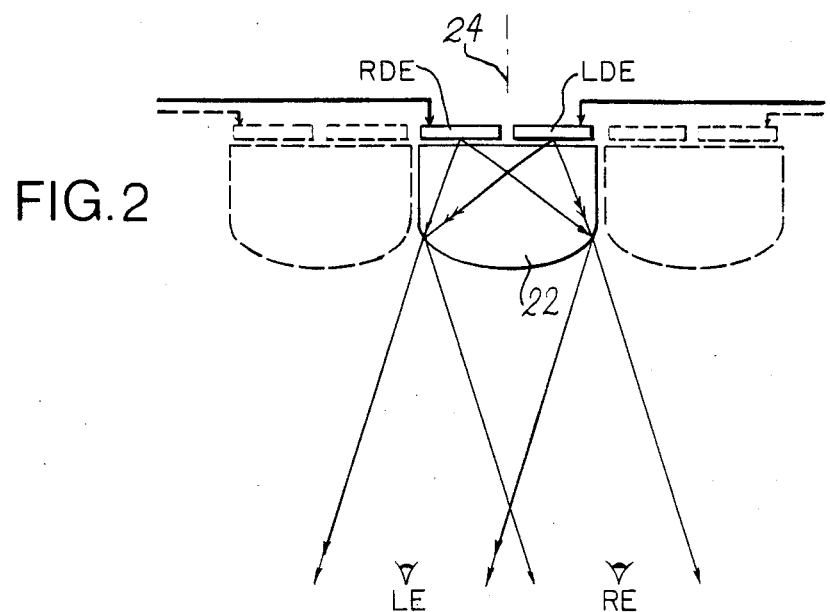
FIG. 2 is a sectional view of a cylindrical lens with its two associated display elements.
Figure 3:
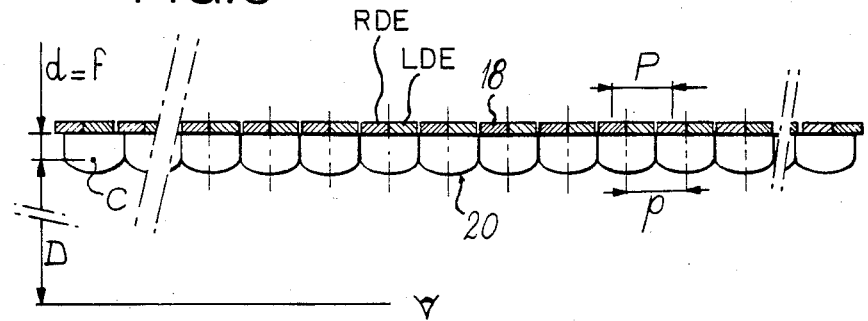
FIG. 3 is a sectional view of a matrix display screen with its lenticular frame.
Figure 4:
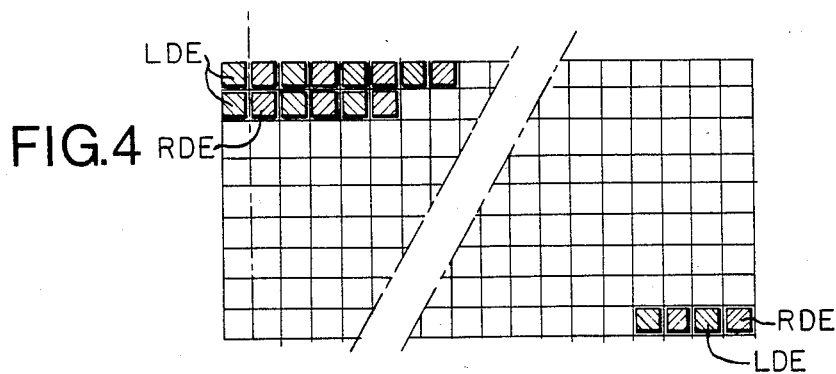
FIG. 4 is a front view of the same screen.

The structure and operation of this device are illustrated in FIGS. 2, 3 and 4. Firstly, FIG. 2 shows, in cross-section, a cylindrical lens 22, in whose focal plane are formed two image elements. In the center of the frame these two elements are arranged on either side of the median plane 24. It can be either a display element if the screen is engaged with the frame (which is the case illustrated) or an image element if the screen is separated from the frame. The element to the left of the median plane corresponds to an image perceived by the right eye RE of the viewer. Thus, this element is called "right-hand display element" or RDE. Conversely, the element to the right of the median plane is viewed by the left eye LE of the viewer and is called the "left-hand display element" or LDE.

Thus, in the manner illustrated in FIG. 3, a line of the projected image or the matrix display screen comprises 2N alternately left and right elements, where N is the number of lenses.

In FIG. 3, it is possible to see at the two ends of the frame, the effect due to the difference of the spacings of the two structures. As the spacing of the picture exceeds that of the frame, the centers of the elements are displaced with respect to the corresponding centers of the lenses, and it is this effect which leads to an improvement in the observation of the relief.

This can be explained with reference to FIG. 3, which shows the spacing P of the picture, the spacing p of the frame, the distance D between the observer's eye and the optical center C of the lenses, the distance d between this center and the focal plane of the frame and which is also equal to the focal distance f of the lenses. According to the invention, the spacings P and p are connected by the relation:

$$\frac{P}{p} = \frac{D+d}{D}$$

or $$P = p\left(1 + \frac{d}{D}\right).$$

In practice, D varies between approximately 60 and 200 cm and d between 0.3 and 3 cm. Thus, the radio d/D varies between $1.5 \cdot 10^{-3}$ and $5 \cdot 10^{-2}$ and the ratio P/p of the spacings falls within this range.

Although this ratio may appear to be small, it must be borne in mind that when the image formed consists of several overlapping elements (e.g. 30) the precision required from the optical separator forming the frame is extreme. In the prior art, the parallax effect resulting from the identity of the spacings led to an error, due to the fact that the right eye perceives the image elements intended in actual fact for the left eye and vice versa. It was therefore necessary to only use images with low resolution (e.g. two overlapping elements). With the invention, the number of overlapping images can be much larger (30 and more).

The shape of the image projected or from the screen is shown in FIG. 4. If the screen is engaged on the frame, it has roughly the same dimensions as the latter. If it is separated from the frame, it can be smaller than the latter and the projection optics then have a magnification which is greater than unity and is adjustable.

Each line of the screen, no matter whether it is on the frame or is separated therefrom, is controlled by a signal from shooting cameras, unless there are two overlapping groups of elements. Generally, the control of a liquid crystal, matrix display screen is well known and will not be described here. It is sufficient to point out that the cost bands forming the electrodes of such a screen are raised sequentially to appropriate potentials to enable the resulting electrical field to appropriately orient the molecules of the liquid crystal. For example, it is possible to use liquid crystals having an electrically controlled birefringence and positioned between a crossed analyzer and a polarizer. Such an apparatus makes it possible to obtain halftones (a few dozen grey tones), which is particularly useful in the application in question as has been stressed hereinbefore.

In the case of the invention, each column electrode is associated with display elements to be seen by the left eye or by the right eye. Thus, the left and right-hand columns alternate. For controlling the elements of a given line, it is therefore necessary to apply to the corresponding line electrode a certain potential and to the column electrode the signals corresponding to the line signals ($S_R$, $S_L$) emanating alternately from the right-hand camera (RC) and the left-hand camera (LC).

Figure 5:
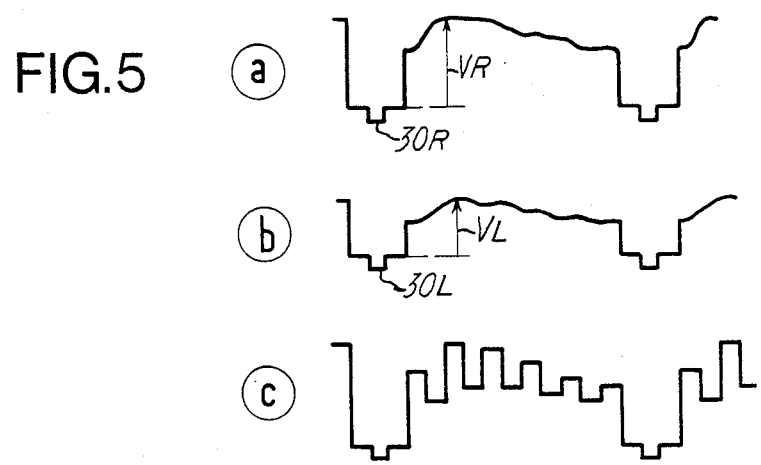
FIG. 5 depicts the two video frequency signals and a multiplexed signal.

FIG. 5 illustrates the possible form of these signals. It is possible to see at (a) the typical form of a line signal, with the sync pulse 30R followed by an amplitude voltage level $V_R$ representing the light intensity variation along the analyzed line. It is the signal supplied by the right-hand camera. Line (b) represents the same elements 30L, $V_L$ for the left-hand camera.

Line (c) illustrates a multiplexed signal, in which there is an alternation of the pulses translating the voltages $V_R$ and $V_L$. This multiplexing can be carried out by circuit 10 of FIG. 1, in which case circuit 14 is rendered useless, because the sequence of the voltage pulses constituting the multiplexed signal can constitute (after amplification) the sequence of voltages to be applied to the column electrodes of the display screen. Conversely, if there is no circuit 10 and if the two video frequency signals are transmitted separately, it is necessary on reception to form the signals which, alternately, will excite the right- and left-hand column electrodes, this being the function of circuit 14. Naturally, it is possible to use other multiplexing types, e.g. by operating line by line or frame by frame.

The research of the inventors has also shown that it is important for the shooting signals to be strictly balanced (to within a few percent). Thus, the cameras must be associated with means making it possible to balance the levels of the signals which they supply (signals a and b in FIG. 5). Such balancing means are of a conventional nature in video shooting technology and also the cameras can be synchronized.

When the number of display elements associated with each lens exceeds that of the cameras, it is necessary to electronically compose complementary images. Preferably, this takes place in the receiver, which makes it unnecessary to transmit the signals corresponding to the complementary images. Thus, on the basis of the two right and left images taken by the two cameras, it is possible to define the distance of points in the scene transmitted and then reconstruct by combining the image signals the same number of desired images corresponding to the different viewpoints. All these images overlap on the matrix screen. Thus, the observer has the latitude of modifying his observation angle.

Figure 6:
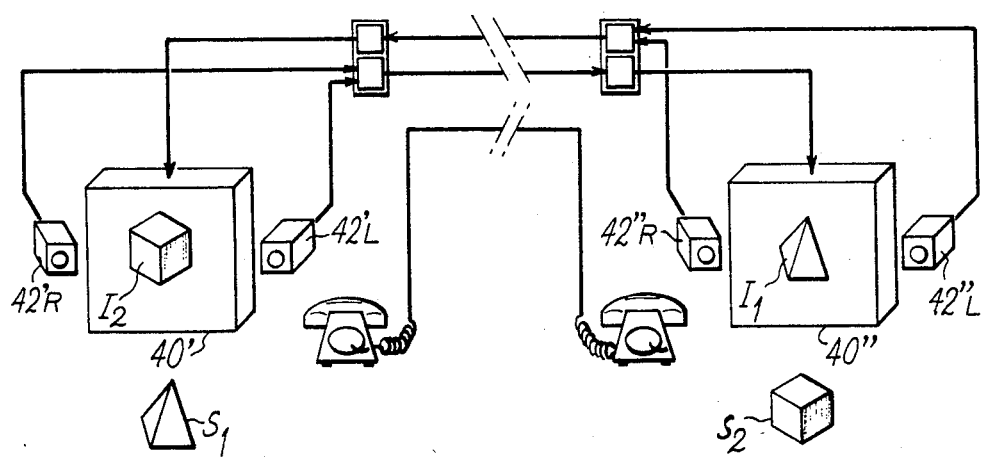
FIG. 6 shows an embodiment of a visiophony system utilizing the invention.

FIG. 6 illustrates a visiophony system with two cameras according to the invention. Two receivers 40', 40" are in each case surrounded by two cameras 42'L, 42'R, on the one hand and 42"L, 42"R, on the other. The receivers are connected to the cameras through the same telecommunications system. The interest of this arrangement is that it obviates the parallax error caused by all the prior art means without relief and having a single camera and without using a mirror. Naturally, it is possible to use a single shooting means in place of the two cameras, provided that it can take two shots at two different angles on either side of each receiver (e.g. a camera associated with mirrors or prisms).

Naturally, color transmission can be obtained by the use of trichromatic cameras when shooting and trichromatic filters upon reconstruction.

Figure 7:
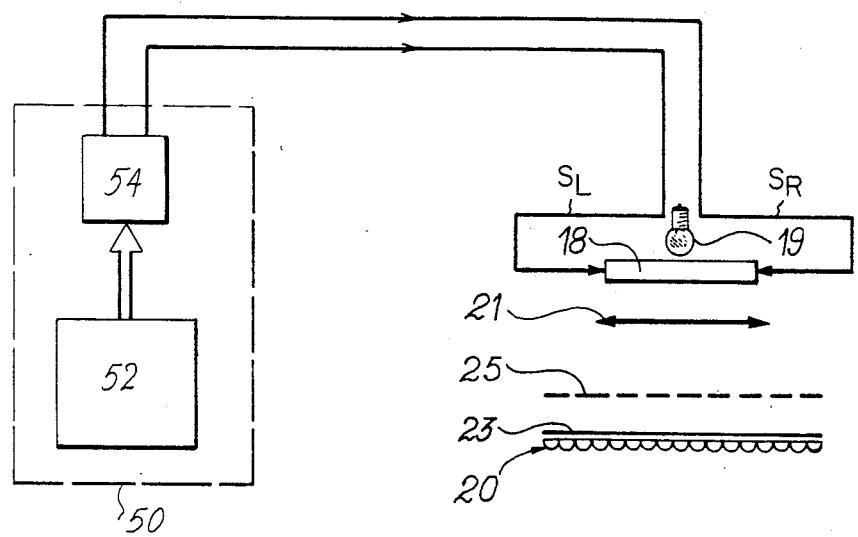
FIG. 7 is a diagram corresponding to the variant in which the images are calculated by informatics means.

FIG. 7 diagrammatically illustrates the construction of an apparatus according to the second variant of the invention, which utilizes image calculating means. The display device is shown in a variant corresponding to the use of projection means, but it would also be possible to use a screen attached to the lenticular frame. As in the case of FIG. 1, the display device comprises a matrix screen 18 controlled by two connections respectively carrying signals $S_R$ and $S_L$, a projection lamp 19, a lenticular network 20 formed by cylindrical lenses and an optical system 21. The originality of this variant compared with the first variant is that the signals $S_R$ and $S_L$ are produced by informatics means diagrammatically represented by block 50. These means comprise an image or picture calculator 52, particularly constituted by a microprocessor, and an image or picture memory or store 54. Calculator 52 supplies the memory with left- and right-hand images able to reconstruct the relief impression. These images are then read into the memory and the reading signals constitute the signals $S_R$ and $S_L$ necessary for the display.

Means 50 will not be described here, because they are well known in the art. In this connection, reference can be made to the work "La Réalisation des logiciels graphiques interactifs", published by Eyrolles, 1981.

According to the operating conditions of the invention, it may be diserable to add a diffusing screen in the focal plane of frame 20, as illustrated in FIG. 7 by element 23.

It may also be advantageous to insert between liquid crystal cell 18 and frame 20, an amplitude filter (25 in FIG. 7) formed by substantially opaque bands and having a spacing adapted to that of the image. The object of this screen is to soften the transitions between the different display elements. This latter arrangement is particularly advantageous when using more than two image elements behind each lens.

It should be pointed out that the inventors have realized an apparatus according to the invention with a liquid crystal cell comprising 256×256 cells having 32 grey degrees and a lenticular frame with 128 lenses, covered in its focal plane by a diffusing screen. The surface of the liquid crystal cell is 2 m$^2$ and that of the lenticular frame is approximately 20×20 cm$^2$. The surface of the frame is dependent on the power of the lamp used for projecting the image of the cell onto the lenticular frame. In a normally illuminated room, the frame can normally having dimensions 10×10 cm$^2$. The diffusing screen has a thickness less than 0.1 mm and the lens has a focal length of 80 mm.

What is claimed is:

1. A process for the display of relief moving pictures, comprising the steps of:
    (a) transforming the optical image of a scene viewed along a first line of sight into a first sequence of electrical signals representing light intensity variation;
    (b) transforming the optical image of said scene viewed along a second line of sight into a second sequence of electrical signals representing light intensity variation;
    (c) transmitting said first sequence of electrical signals to a first plurality of vertical columns of display elements for controlling the condition of said display elements;
    (d) transmitting said second sequence of electrical signals to a second plurality of vertical columns of display elements for controlling the condition of said display elements;
    (e) passing light through said display elements and onto a focal plane of a lenticular frame comprising a plurality of regularly spaced, vertical cylindrical lenses with front convex diopter, to form corresponding first and second pluralities of image elements, wherein said image elements of said first plurality of image elements are formed by light projected through said respective display elements of said first plurality of vertical columns, said image elements of said second plurality of image elements are formed by light projected through said respective display elements of said second plurality of vertical columns, said first plurality of image elements and said second plurality of image elements are arranged in an alternating sequence of columns in said focal plane of said lenticular frame, and the spacing between centers of adjacent image elements is greater than the spacing between centers of adjacent lenses such that said image elements form an image in said focal plane which is larger than said lenticular frame.

2. The process of claim 1, wherein the light passed through said display elements is then passed through an optical means for forming said image in said focal plane of the lenticular frame.

3. The process of claim 2, wherein said image is a halftone image.

4. The process of claim 2, wherein said first and second lines of sight are non-parallel.

5. The process of claim 2, wherein said first and second sequences of electrical signals are transmitted by time multiplexing.

6. The process of claim 2, wherein said first and second sequences of electrical signals are transmitted by coding, said first sequence of electrical signals being transmitted completely and said second sequence of electrical signals being transmitted according to their variation with respect to said first sequence of electrical signals.

7. The process of claim 2, wherein said first and second pluralities of image elements are overlapping.

8. The process of claim 2, wherein said first and second sequences of electrical signals are produced by informatics means.

9. The process of claim 2, wherein said first and second sequences of electrical signals are produced by first and second cameras respectively.

10. The process of claim 9, wherein the number of cameras is smaller than the number of pluralities of image elements forming the image, further comprising the step of forming complementary pluralities of image elements from said first and second sequences of electrical signals, said complementary pluralities of image elements being displayed with said first and second pluralities of image elements.

11. An apparatus for the display of relief moving pictures comprising:
    (a) a light source for projecting light beams;
    (b) a display means comprising first and second pluralities of vertical columns of display elements, the condition of each of said display elements being controllable by electrical signals, said display being arranged in the path of said projected light beams;
    (c) a reception signal processing means connected to receive first and second sequences of electrical signals representing light intensity variation and connected to transmit said first and second sequences of electrical signals to said display means for respectively controlling the condition of said first and second pluralities of vertical columns of display elements; and
    (d) a lenticular frame comprising a plurality of regularly spaced, vertical cylindrical lenses with front convex diopter and having a focal plane, said lenticular frame being arranged to receive light beams projected from said light source and transmitted through said display means such that first and second pluralities of image elements are formed in said focal plane of said lenticular frame in alternating sequence, said image elements of said first plurality of said elements being formed by light beams projected through said respective display elements of said first plurality of vertical columns, said image elements of said second plurality of image elements being formed by light beams projected through said respective display elements of said second plurality of vertical columns, and the spacing between centers of adjacent image elements being greater than the spacing between centers of adjacent lenses such that said image elements form an image in said focal plane which is larger than said lenticular frame.

12. The display apparatus of claim 11, wherein said display means is arranged in the focal plane of said lenticular frame.

13. The display apparatus of claim 11, further comprising informatics means capable of outputting sequences of electrical signals representing a processed image for controlling the condition of said display elements.

14. The display apparatus of claim 11, wherein said display means comprises a matrix screen capable of forming half-tones.

15. The display apparatus of claim 11, wherein said display means comprises a liquid crystal display means.

16. A visiophony system comprising first and second display apparatuses connected by a telecommunications network, each of said display apparatuses being as defined in claim 11.

17. The display apparatus of claim 11, further comprising an optical means for forming said image in the focal plane of said lenticular frame, wherein said display means is arranged separate from said lenticular frame and said optical means is arranged between said display means and said lenticular frame.

18. The apparatus of claim 17, further comprising a diffusing screen arranged in the focal plane of said lenticular frame.

19. The apparatus of claim 17, further comprising an amplitude filter formed by a plurality of opaque strips and arranged between said display means and said lenticular frame.

20. The display apparatus of claim 11, further comprising camera means for transforming the optical image of a scene viewed along first and second lines of sight into first and second sequences respectively of electrical signals representing light intensity variation.

21. The display apparatus of claim 20, further comprising multiplexing means connected between said camera means and said reception signal processing means.

22. The display apparatus of claim 20, wherein said camera means comprises means for balancing the respective signal levels of said first and second sequences of electrical signals.

23. The display apparatus of claim 20, wherein said camera means comprises first and second cameras oriented along said first and second lines of sight respectively.

24. The display apparatus of claim 23, wherein each of said first and second cameras is of the solid-state matrix analyzer type.

* * * * *